US008336435B2

(12) United States Patent
Grenier

(10) Patent No.: US 8,336,435 B2

(45) Date of Patent: Dec. 25, 2012

(54) ANVIL FOR A ROTARY CUTTING UNIT AND A ROTARY CUTTING UNIT HAVING AN ANVIL

(75) Inventor: Gilbert Grenier, Annonay (FR)

(73) Assignee: Sandvik Intellectual Property AB, Sandviken (SE)

( * ) Notice: Subject to any disclaimer, the term of this patent is extended or adjusted under 35 U.S.C. 154(b) by 123 days.

(21) Appl. No.: 11/264,381

(22) Filed: Nov. 2, 2005

(65) Prior Publication Data

US 2006/0101974 A1 May 18, 2006

(30) Foreign Application Priority Data

Nov. 3, 2004 (SE) .................................... 0402665-4

(51) Int. Cl.

*B23D 25/12* (2006.01)
*B26D 1/22* (2006.01)
*B26D 7/20* (2006.01)

(52) U.S. Cl. ................................ 83/659; 83/346; 83/506

(58) Field of Classification Search .................... 83/346, 83/348, 658, 659, 506, 566; 492/49–56, 492/38, 40, 60

See application file for complete search history.

(56) References Cited

U.S. PATENT DOCUMENTS 242,058 A * 5/1881 Schurmann ........................ 492/6
3,677,122 A * 7/1972 Rautine ............................ 83/506
3,840,958 A * 10/1974 Mahn ................................ 492/6
3,852,860 A * 12/1974 Tewes ............................... 492/6
4,158,128 A * 6/1979 Evdokimov et al. .......... 219/469
4,289,055 A 9/1981 Von Schriltz
4,455,903 A * 6/1984 Kesten ............................ 83/346
4,480,516 A * 11/1984 Leroy ............................... 83/98
4,553,461 A * 11/1985 Belongia ......................... 83/344
4,756,219 A 7/1988 Pohl et al.
4,759,247 A * 7/1988 Bell et al. ......................... 83/346
4,989,487 A * 2/1991 Staley ............................. 83/506
5,047,607 A * 9/1991 Briffod ...................... 219/69.12
5,083,488 A * 1/1992 Stanley et al. .................. 83/344
5,156,076 A * 10/1992 Rosemann ....................... 83/344
5,170,547 A * 12/1992 Nikulainen et al. ............ 492/53
5,174,185 A * 12/1992 Aichele ........................... 83/346

(Continued)

FOREIGN PATENT DOCUMENTS

| | | |
|---|---|---|
| DE | 42 15 947 | 11/1992 |
| EP | 1 520 668 | 4/2005 |
| JP | 47-1412 | 1/1972 |
| JP | 48-21499 | 3/1973 |

*Primary Examiner* — Ghassem Alie
*Assistant Examiner* — Bharat C Patel
(74) *Attorney, Agent, or Firm* — Morgan, Lewis & Bockius LLP

(57) ABSTRACT

A rotatable anvil for a rotary cutting unit, including an axle, at least one anvil portion adapted to co-operate with a knife member of a rotary cutter, a pair of load transmitting portions adapted to abut a pair of abutment members of the rotary cutter, the pair of load transmitting portions being arranged on each side of the anvil portion, and deflection means provided underneath at least one of the anvil portion and the load transmitting portions. The invention also relates to a rotary cutting unit including a rotary cutting drum and a rotatable anvil.

8 Claims, 8 Drawing Sheets

U.S. PATENT DOCUMENTS 5,257,965 A * 11/1993 Fuchs et al. ........................ 492/6
5,433,308 A * 7/1995 Gagnon .......................... 193/37
5,567,448 A * 10/1996 Frankland ..................... 425/363
5,913,266 A * 6/1999 Nakaya et al. ................ 101/375
6,244,148 B1 * 6/2001 Vees .............................. 83/348
6,554,754 B2 * 4/2003 VanRens ......................... 492/10
6,684,747 B2 * 2/2004 Aichele .......................... 83/344
7,146,893 B2 * 12/2006 Aichele .......................... 83/346

* cited by examiner

PRIOR ART

ANVIL FOR A ROTARY CUTTING UNIT AND A ROTARY CUTTING UNIT HAVING AN ANVIL

This application claims priority under 35 U.S.C. §119 to Swedish Patent Application No. 0402665-4 filed on Nov. 3, 2004, which is incorporated by reference herein in its entirety.

FIELD OF THE INVENTION

The present invention relates generally to a rotatable anvil for a rotary cutting unit, and more particularly to a rotatable anvil for a rotary cutting unit including an axle, at least one anvil portion adapted to co-operate with a knife member of a rotary cutter, and a pair of load transmitting portions adapted to abut a pair of abutment members of the rotary cutter, the pair of load transmitting portions being arranged on each side of the anvil portion. The present invention also relates to a rotary cutting unit including a rotary cutter and the rotatable anvil.

BACKGROUND OF THE INVENTION

A known rotary cutting unit is disclosed in U.S. Pat. No. 6,244,148, and includes a rotary cutter in working relationship with a rotary anvil. The rotary cutter is provided with a substantially circular-cylindrical body having a surface and at least one knife member protruding from the surface, the radially peripheral part of the knife member having a diameter larger than that of the surface. Each side of the rotary cutter is provided with an axle supported in bearings. Between the axles and the surface, i.e. on each side of the surface, a pair of annular abutment members are provided. The abutment members have a diameter larger than that of the surface, in order to allow abutment against a pair of load receiving portions of the anvil.

The anvil is provided with an anvil portion and the pair of load receiving portions. The anvil portion is adapted to co-operate with the knife member of the rotary cutter, whereas the load receiving portions are adapted to abut the abutment members of the rotary cutter. The anvil is supported in bearings outside the anvil portion and outside the load bearing portions, seen in the axial extension of the anvil.

Furthermore, the abutment members have a diameter which is substantially the same as the radially peripheral part of the knife member. The abutment members are adapted to lie against and transmit loads such that a predetermined pressure is exerted on the load receiving portions of the anvil to achieve a desired cutting property. Optionally, the abutment may also transmit rotation of the rotary cutter drum to the anvil surface, such that it turns in a direction opposite to that of the rotary cutter. A product is cut from a web introduced between the drums by the centrally arranged knife member.

The described rotary cutter however suffers from the drawback that the portions of the knife members in the axial center of the rotary cutting drum do not cut as precisely as the portions of the knife members closer to the axial periphery thereof. This is due to the fact that the rotary cutting drum exerts a pressure onto the anvil surface via the abutment members, thereby causing the anvil to be bent. This is shown in FIG. 5, illustrating the principle of a prior art anvil A corresponding to the anvil disclosed in U.S. Pat. No. 6,244,148. A pair of load receiving portions B are arranged on either sides of the axial extension of an anvil portion C, whereas a pair of annular support surfaces D for co-operating with bearings are arranged on either sides of the pair of load receiving portions B. When load E is applied to the load receiving portions, the central portion of the anvil A will be bent slightly downwards as shown (exaggerated) by the broken line F due to the counter directed force G on the surface D, i.e. at the bearings. Such bending may be denoted negative bending.

Another prior art rotary cutting unit has an anvil for cooperation with a rotary cutting drum having two or more knife members arranged side by side. Such a rotary cutter not only suffers from the drawback described above, but also in that it has a long axial extension, causing the anvil drum and the rotary cutting drum to also be bent by gravity, i.e. the longer and heavier the anvil, the more it will be bent negatively by gravity that will add to the described effect.

The use of two or three parallel knife members or one large knife member on a long rotary cutter to co-operate with such an anvil will thus only have acceptable cutting properties at the peripheral portion of the anvil, whereas the knife member closer to the central portions may not cut through the web to be cut.

SUMMARY OF THE INVENTION

An object of the invention is to is to increase the reliability and the life time of an anvil.

In an embodiment, the invention provides a rotatable anvil for a rotary cutting unit, including an axle, at least one anvil portion adapted to co-operate with a knife member of a rotary cutter, a pair of load transmitting portions adapted to abut a pair of abutment members of the rotary cutter, the pair of load transmitting portions being arranged on each side of the anvil portion, and deflection means provided underneath at least one of the anvil portion and the load transmitting portions.

In another embodiment, the invention provides a rotary cutting unit, including a rotary cutting drum and a rotatable anvil. The rotatable anvil includes an axle, at least one anvil portion adapted to co-operate with a knife member of the rotary cutting drum, and a pair of load transmitting portions adapted to abut a pair of abutment members of the rotary cutting drum, the pair of load transmitting portions being arranged on each side of the anvil portion, and deflection means provided underneath at least one of the anvil portion and the load transmitting portions.

The anvil may include a core and a mantle. The deflection means may include at least one annular groove in an interior surface of the mantle. The deflection means may include at least one annular groove in an exterior surface of the core. The anvil may include a core having axial end surfaces, and the deflection means may include at least one axial groove in the end surfaces. The anvil portion may include a single anvil portion. The anvil portion may include a plurality of anvil portions. The rotary cutter may include at least one centrally disposed knife member, and a single anvil portion. The rotary cutter may include a plurality of axially disposed knife members and a plurality of anvil portions adapted to co-operate with at least one of the axially disposed knife members. The rotary cutter may include a plurality of axially disposed knife members and a single anvil portion.

Hereby, undesired deformations of the rotary cutter and the anvil are compensated when increasing the load, such that the total lifetime of the anvil portions can be increased. Further, the range of possible interferences of the anvil portion and the cutting portion is increased. In particular, when the anvil wears it is possible to compensate by application of more load to the load receiving portions. Hereby it is achieved that the magnitude of the bending of the anvil can be defined by selecting the size, depth, form and number of the annular groove or grooves.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
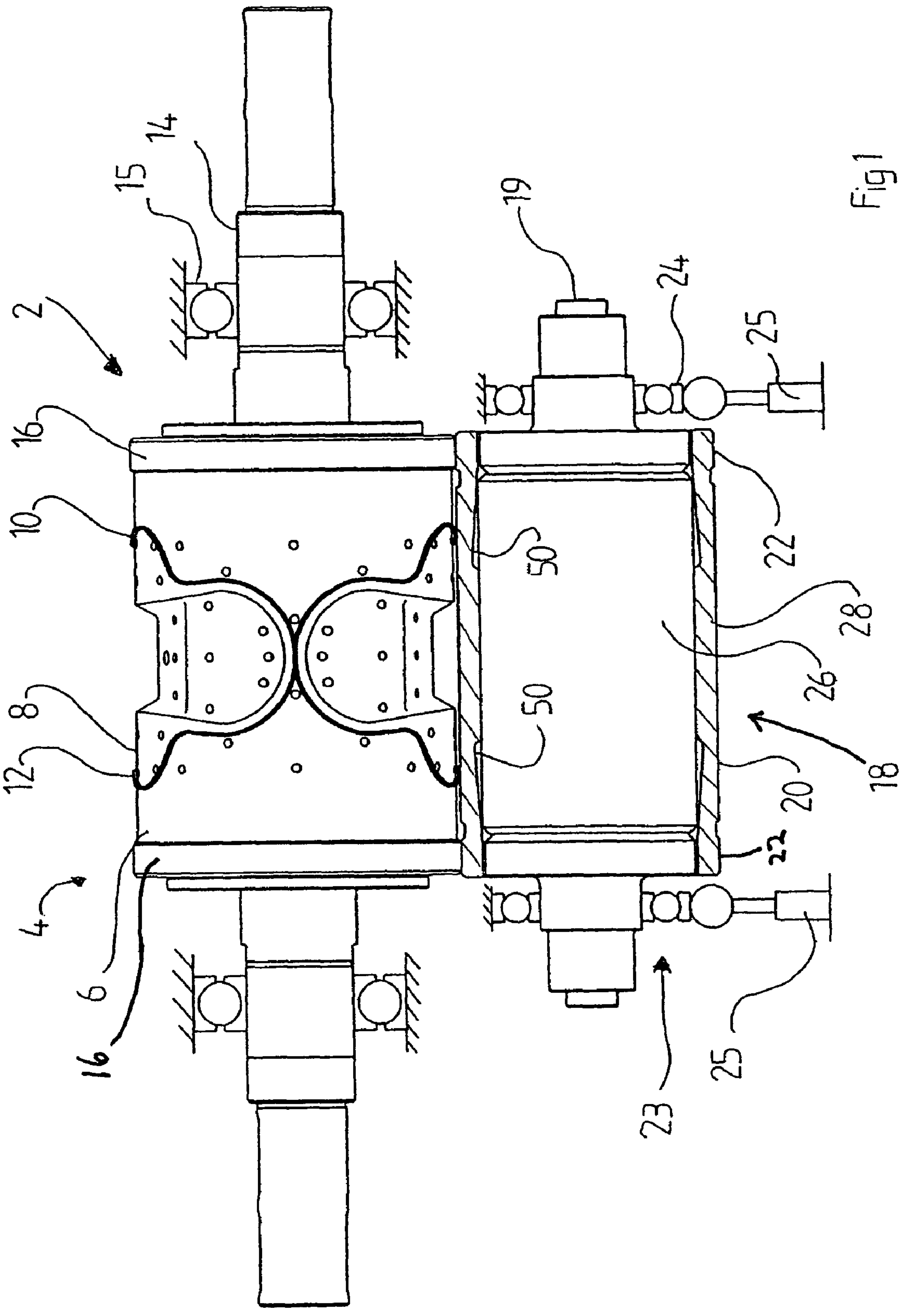
FIG. 1 illustrates a rotary cutting unit including a rotary cutter and an anvil according to a first embodiment of the invention.

FIG. 1 shows a first embodiment of a rotary cutting unit 2 according to an embodiment of the invention. A rotary cutter 4 is provided with a substantially circular-cylindrical hollow or solid body 6 having a surface 8 and at least one knife member 10 protruding from the surface 8. The radially peripheral part 12 of the knife member 10 has a diameter larger than that of the surface 8. The rotary cutter 4 is arranged on or is an integral part of an arbour 14 extending axially from each side of the rotary cutter 4 and being supported in bearings 15. Axially on each side of the surface 8, a pair of annular abutment members 16 are provided. The abutment members 16 have a diameter larger than that of the surface 8, in order to allow abutment against an anvil drum 18.

The anvil drum 18 is provided with an axle 19, an anvil portion 20 and a pair of load transmitting portions 22. The anvil portion 20 is adapted to co-operate with the knife member 10 of the rotary cutter 4, whereas the load transmitting portions 22 are adapted to abut the abutment surfaces 16 of the rotary cutter 4.

Furthermore, the abutment members 16 have a diameter which is substantially the same as the radially peripheral part 12 of the knife member 10. In some cases, the diameter of the part 12 may however be larger or smaller than that of the abutment members 16.

Axially on each side of the anvil portion 20, the axle 19 is rotatably arranged at bearings 23, each covered by a load receiving member 24. Each load receiving member 24 is arranged axially outside each load transmitting portion 22.

A load is applied by a pair of pneumatic cylinders 25 to the load receiving members 24. The load is transmitted further via the load transmitting portions 22 to the abutment members 16, and optionally also via the knife members 10 to the anvil portion 20.

The anvil drum 18 includes a substantially circular-cylindrical core 26 and a substantially circular-cylindrical mantle 28 arranged e.g. by press-fit on the core. The core 26 is preferably made of steel, whereas the mantle 28 may be made of any suitable material, such as steel or hard metal.

Underneath the load transmitting portions 22, an axial annular recess 50 is provided in the inner periphery of the mantle 28. The annular recess 50 extends such that it is at least partly subjected to the pressure by the knife member 10.

Figure 2A:
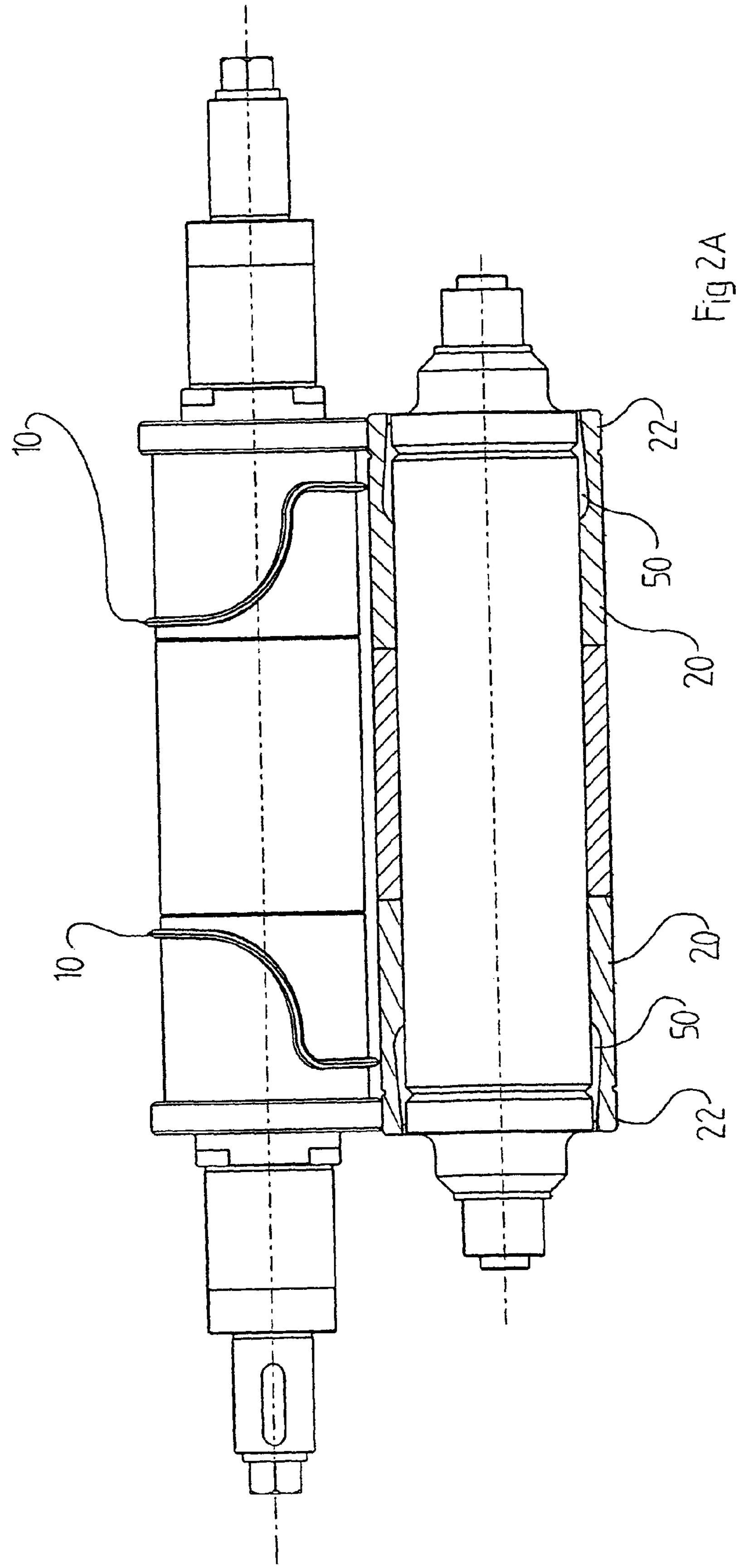
FIGS. 2A-2D illustrate a rotary cutting unit with an anvil according to second to fifth embodiments of the invention.
Figure 2B:
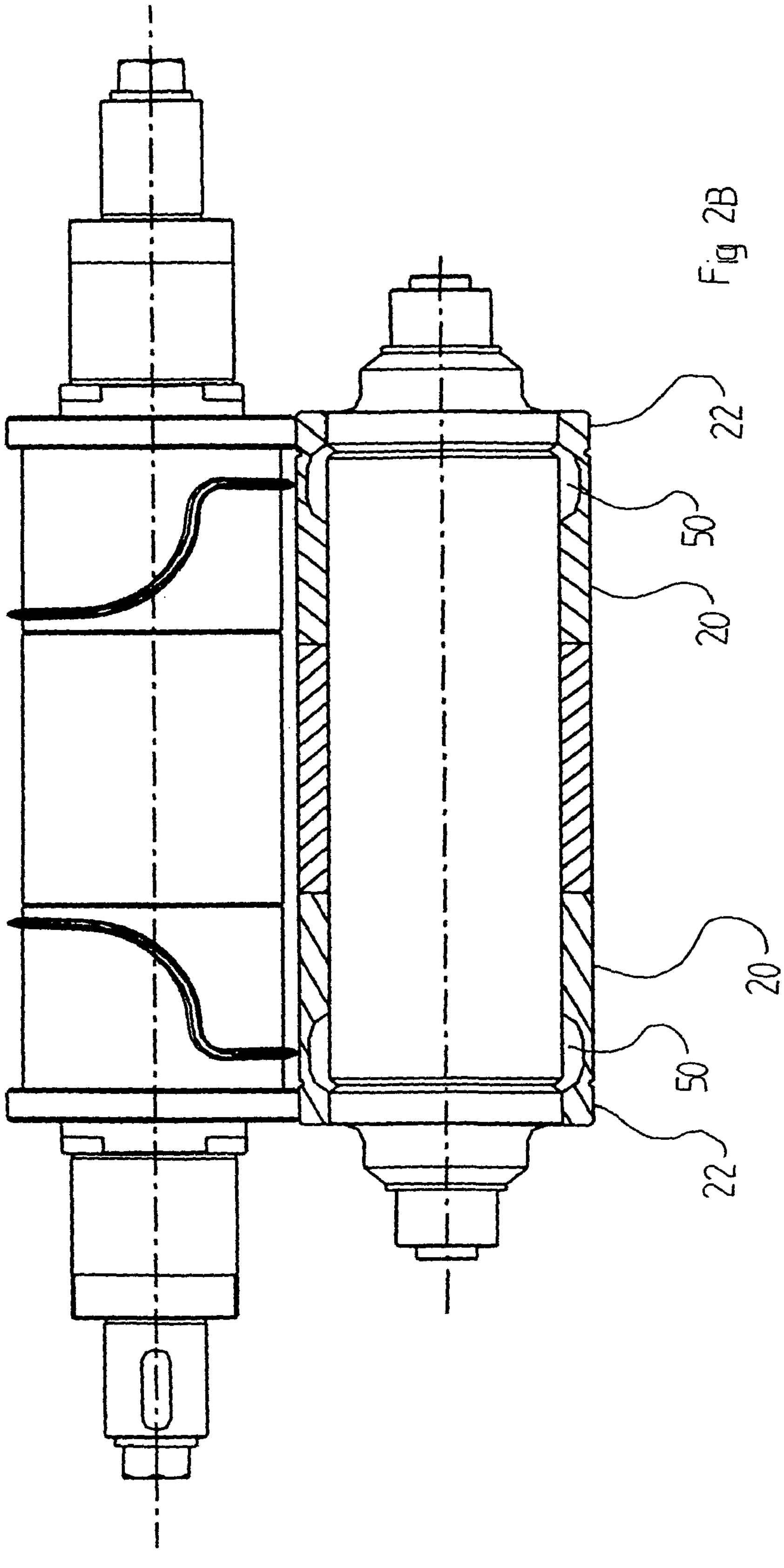
Figure 2C:
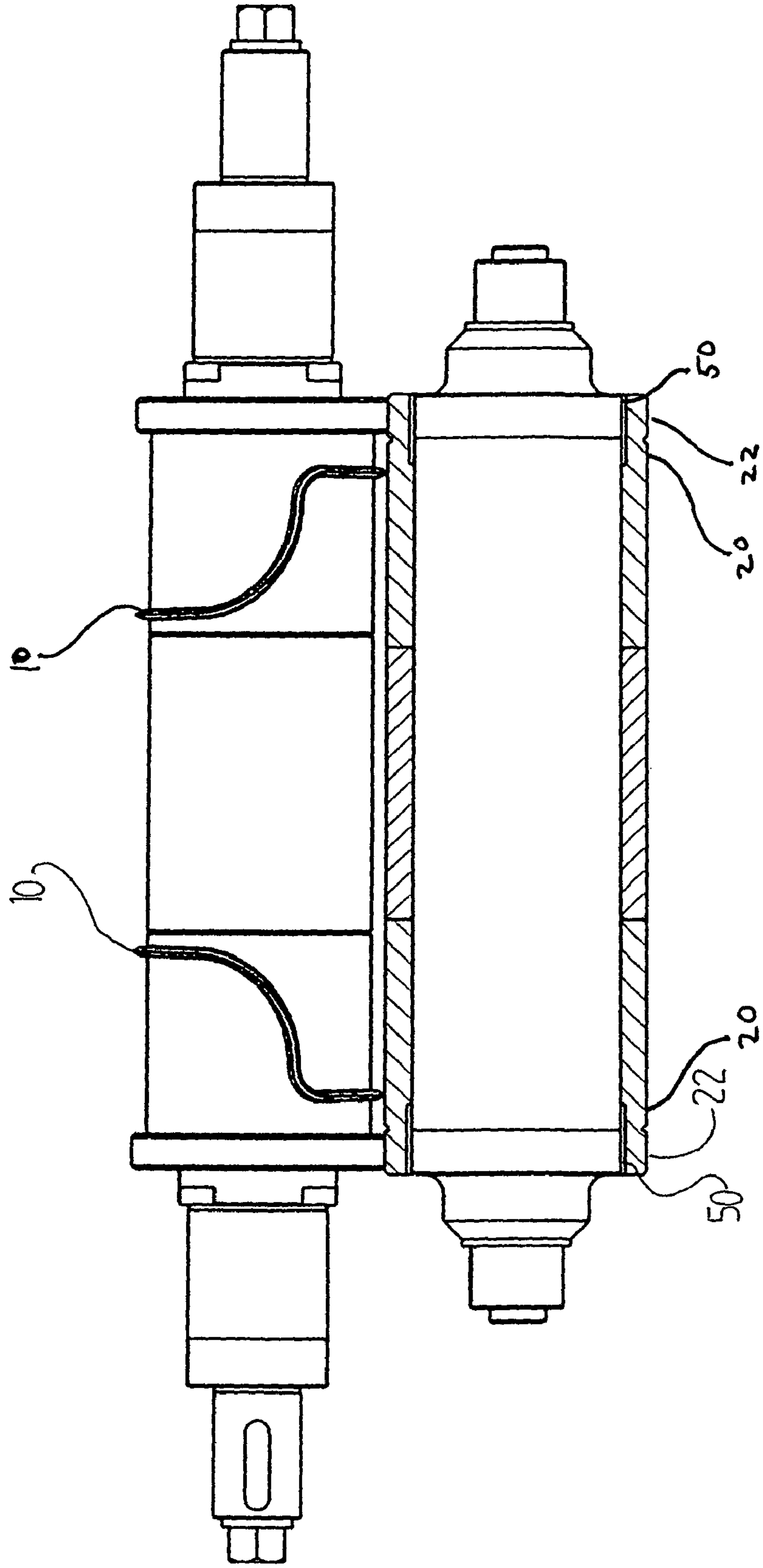
Figure 2D:
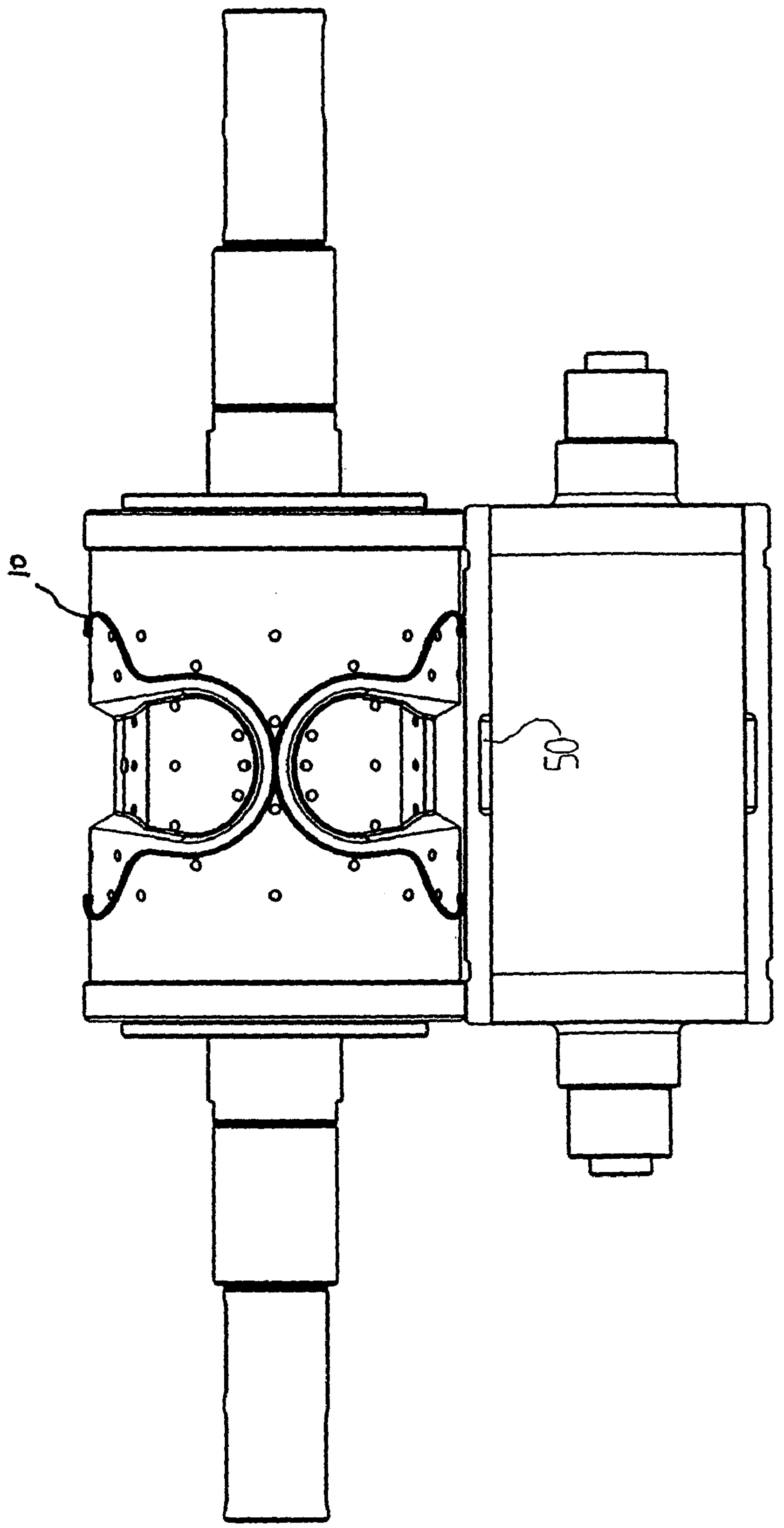
Figure 3:
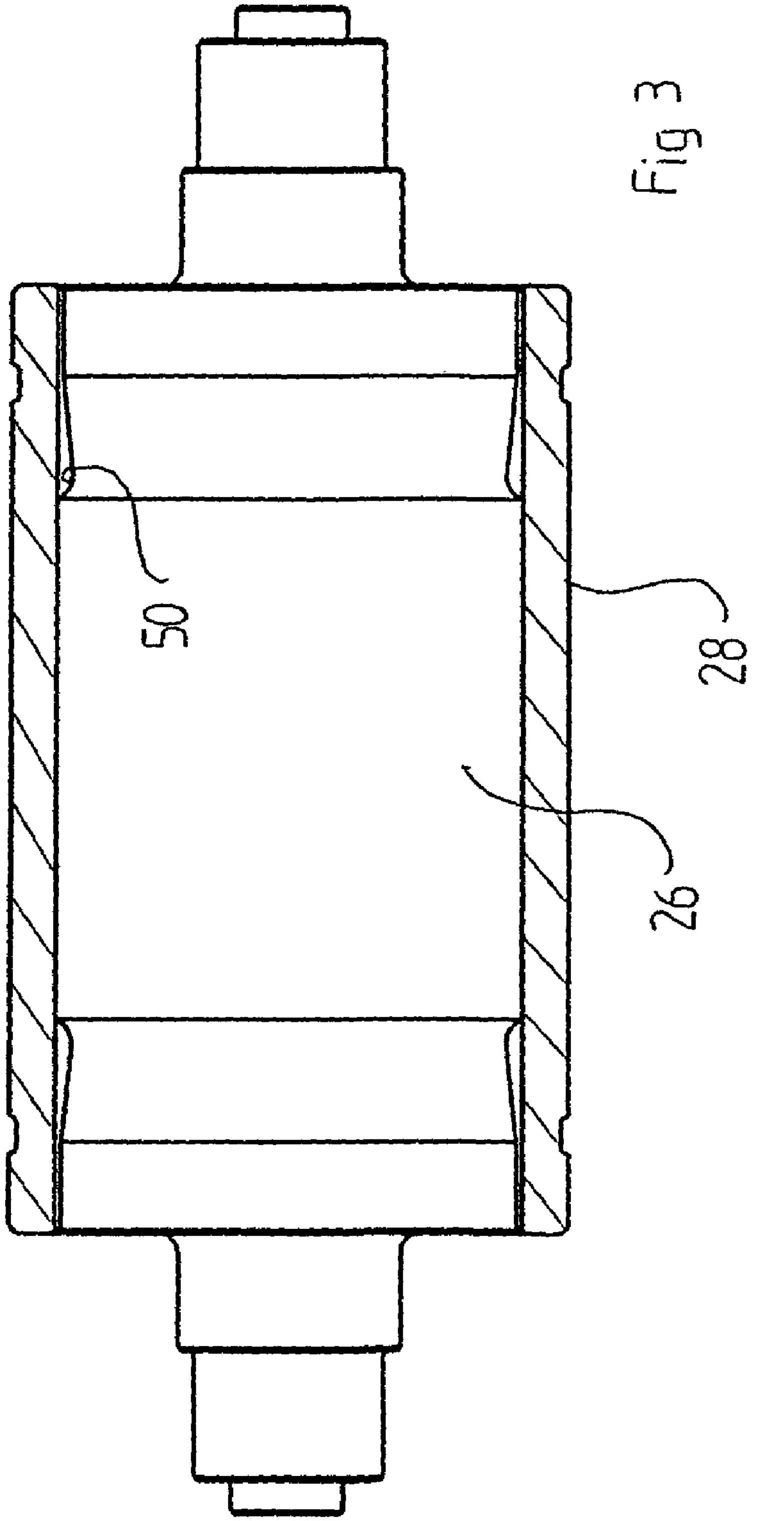
FIG. 3 illustrates an anvil according to a sixth embodiment of the invention.
Figure 4:
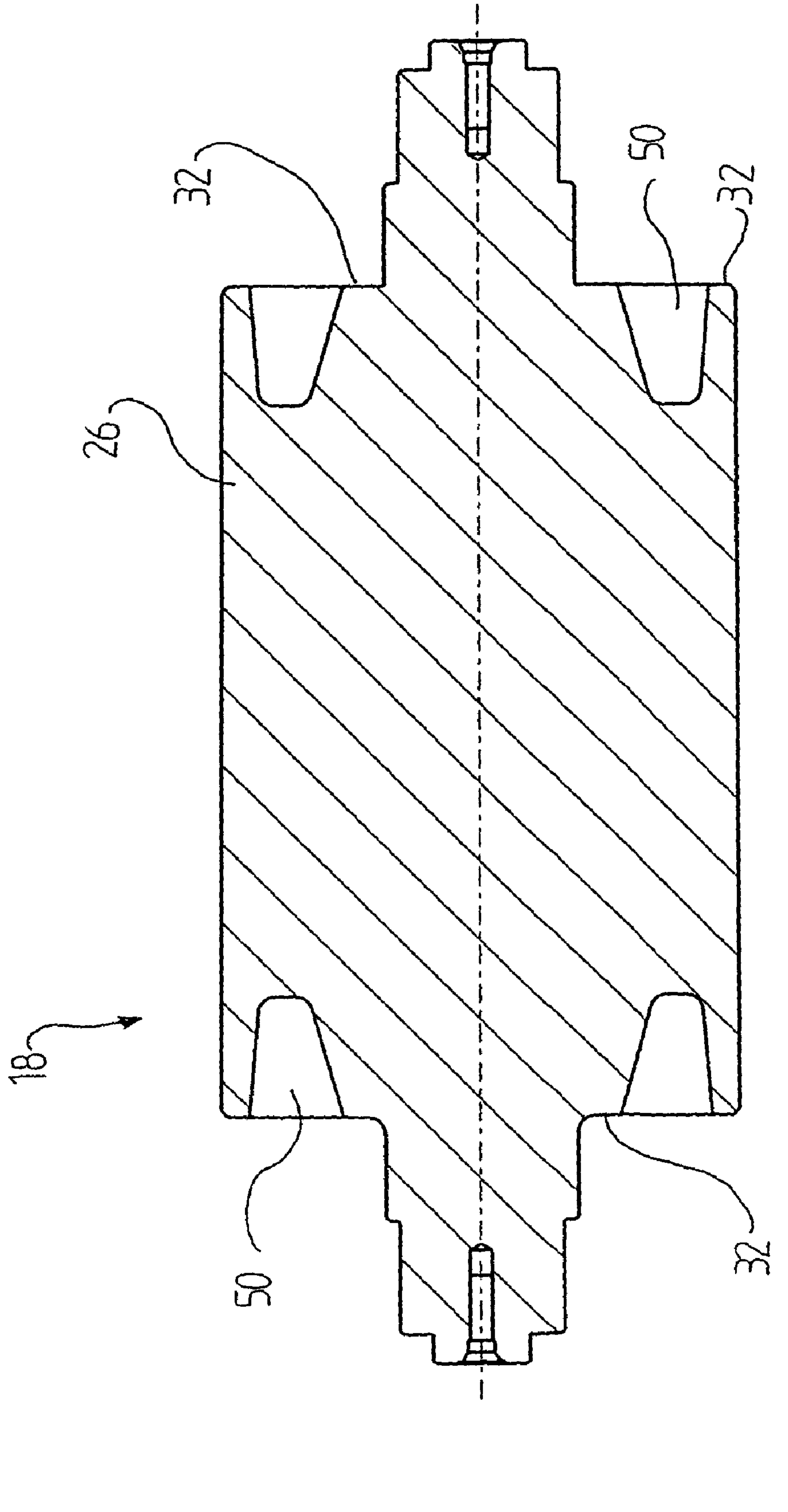
FIG. 4 illustrates an anvil according to a seventh embodiment of the invention.
Figure 5:
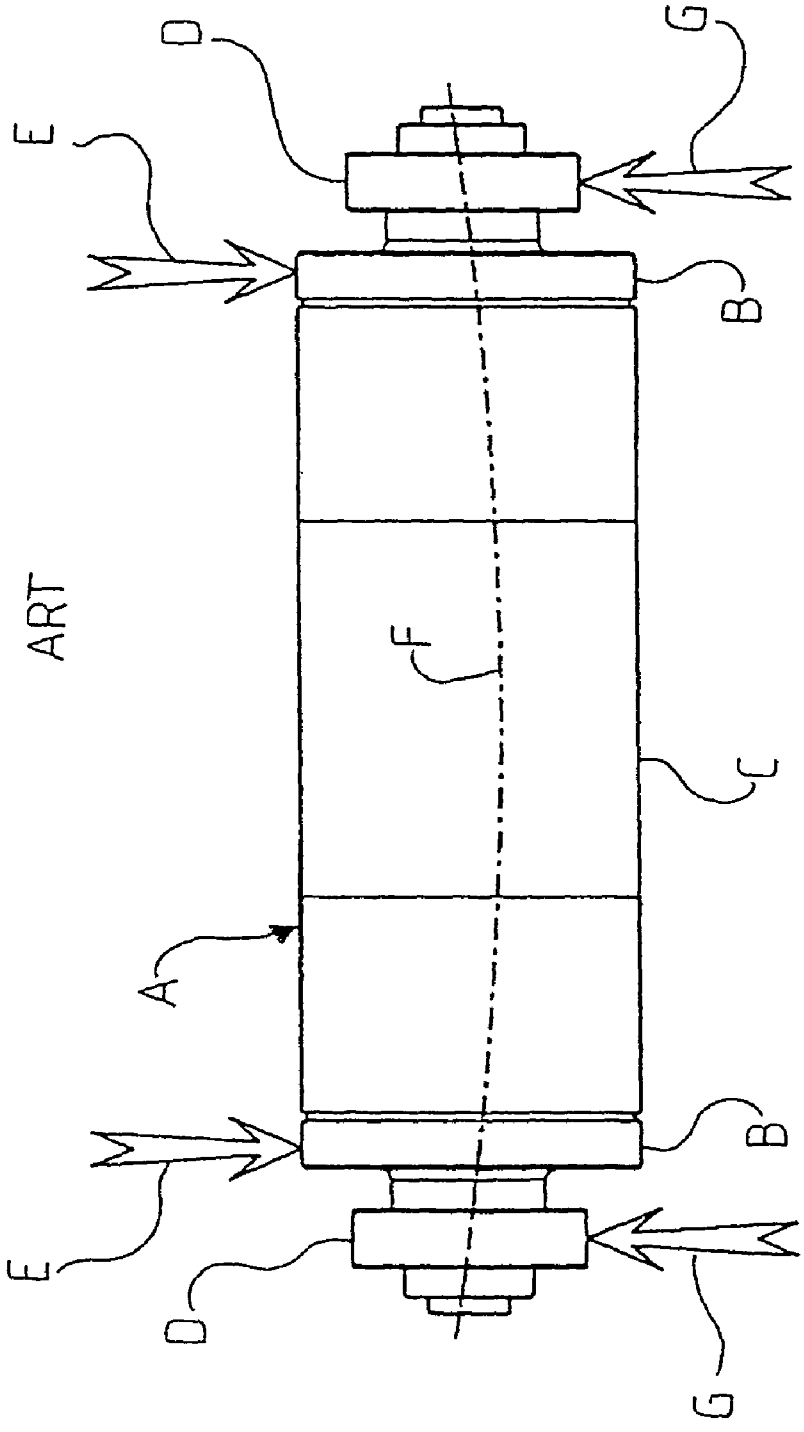
FIG. 5 illustrates a prior art anvil subjected to a load.

According to a second embodiment, shown in FIG. 2A, two separated knife members 10 adapted to co-operate with two axially separated anvil portions 20 are shown. The annular recess 50 extends underneath the load transmitting portions 22 and partially underneath the anvil portions 20. As shown in FIG. 2B, according to a third embodiment, the recess does not extend underneath the load transmitting portions 22, only partially underneath the anvil portions 20. According to a fourth embodiment, shown in FIG. 2C, the annular recess 50 extends underneath the load transmitting portions 22 and underneath the anvil portions 20 that are not directly pressed by the knife member 10. In FIG. 2D, a fifth embodiment is shown, according to which the axial annular recess 50 is provided underneath central portions of the knife member 10. However, the extension of the axial annular recess may extend axially further, e.g. a larger part or the whole of the width of the knife member 10. Furthermore, more than one such recesses may be provided. It is contemplated that in such a case, it may be advantageous to provide a plurality of axially separated recesses. In FIG. 3, a sixth embodiment is shown, according to which the annular groove 50 is made in the core 26 instead of in the mantle 28. A seventh embodiment is shown in FIG. 4. The anvil drum 18 is constituted solely by said core 26 having axial end surfaces 32. In this case, the recess 50 shown in FIGS. 1, 2 and 4, is performed by machining an axial groove in the axial surfaces 32 of the core 26. It should be noted that the embodiments of the anvil shown in FIGS. 1-4 can all be combined in any suitable manner, depending on the desired degree of deflection.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A rotary cutting unit, comprising:

a rotary cutting drum comprising at least one knife member disposed between a pair of axially spaced abutment members;

a rotatable anvil comprising an axle, at least one anvil portion to co-operate with the knife member of the rotary cutting drum, and a pair of load transmitting portions to abut and contact the pair of abutment members of the rotary cutting drum, wherein the pair of load transmitting portions are arranged on each side of the at least one anvil portion; and deflection element defining a bending magnitude of the anvil, wherein the anvil includes a core and a single mantle having an interior surface contacting the core and an opposing exterior surface, wherein the exterior surface of the mantle is continuous and forms the exterior surface of the at least one anvil portion and the pair of load transmitting portions of the anvil, and the exterior surface of the mantle is substantially parallel with the exterior surface of the core across the length of the at least one anvil portion and the pair of load transmitting portions, and wherein the deflection element comprises two annular grooves in the interior surface of the mantle between the core and the mantle, a first annular groove located in a portion of the mantle forming at least a portion of a first of the pair of load transmitting portions and a second annular groove located in a portion of the mantle forming at least a portion of a second of the pair of load transmitting portions.

2. The rotary cutting unit according to claim 1, wherein the rotary cutter includes at least one centrally disposed knife member, and wherein the anvil includes a single anvil portion.

3. The rotary cutting unit according to claim 1, wherein the rotary cutter includes a plurality of axially disposed knife members, and wherein the anvil includes a plurality of anvil portions adapted to co-operate with at least one of the axially disposed knife members.

4. The rotary cutting unit according to claim 1, wherein the rotary cutter includes a plurality of axially disposed knife members, and wherein the anvil includes a single anvil portion.

5. The rotary cutting unit according to claim 4, further comprising at least one load receiving member that covers the axle of the rotatable anvil and receives a load that is transmitted by the load transmitting portion to the abutment members.

6. The rotary cutting unit according to claim 1, wherein the first and second annular grooves are separated by a portion of the mantle that contacts the core.

7. The rotary cutting unit according to claim 6, wherein the annular grooves are located on opposing ends of the rotatable anvil.

8. The rotary cutting unit according to claim 1, wherein the grooves are disposed underneath at least a portion of the knife member.

* * * * *